(12) United States Patent
Kluender

(10) Patent No.: US 10,352,400 B2
(45) Date of Patent: Jul. 16, 2019

(54) PLANETARY GEARBOX

(71) Applicant: Melior Motion GmbH, Hameln (DE)

(72) Inventor: Frank Kluender, Hannover (DE)

(73) Assignee: MELIOR MOTION GMBH, Hameln (DE)

( * ) Notice: Subject to any disclaimer, the term of this patent is extended or adjusted under 35 U.S.C. 154(b) by 257 days.

(21) Appl. No.: 15/314,949

(22) PCT Filed: May 29, 2015

(86) PCT No.: PCT/DE2015/100215
§ 371 (c)(1),
(2) Date: Nov. 30, 2016

(87) PCT Pub. No.: WO2015/185036
PCT Pub. Date: Dec. 10, 2015

(65) Prior Publication Data
US 2017/0198785 A1    Jul. 13, 2017

(30) Foreign Application Priority Data
Jun. 2, 2014 (DE) .................. 10 2014 107 734

(51) Int. Cl.
*F16H 1/28* (2006.01)
*F16H 57/08* (2006.01)
*F16H 35/10* (2006.01)
*F16H 57/12* (2006.01)

(52) U.S. Cl.
CPC ........... *F16H 1/2863* (2013.01); *F16H 35/10* (2013.01); *F16H 57/08* (2013.01); *F16H 57/12* (2013.01); *F16H 2057/087* (2013.01)

(58) Field of Classification Search
CPC .............................. F16H 1/2863; F16H 57/12
See application file for complete search history.

(56) References Cited

U.S. PATENT DOCUMENTS 8,535,198 B2 * 9/2013 Fong ..................... F16H 1/2863
475/331
2013/0203553 A1   8/2013 Fong et al.
2015/0094187 A1   4/2015 Kleinbongartz et al.

FOREIGN PATENT DOCUMENTS

| DE | 3734462 A1 | 4/1989 |
| DE | 9405495 U1 | 8/1994 |
| DE | 202012101546 U1 | 7/2013 |
| EP | 2693079 A2 | 2/2014 |
| FR | 1547401 A | 11/1968 |

* cited by examiner

*Primary Examiner* — Derek D Knight
(74) *Attorney, Agent, or Firm* — Leydig, Voit & Mayer, Ltd.

(57) ABSTRACT

A planetary gearbox has multiple first gears in the form of planetary gears, each mounted for rotation about a first axis of rotation. Each gear has two stages, with a first stage formed by bevel teeth which mesh with a ring gear, and with teeth forming a second stage. The planetary gearbox also has a second gear in the form of a ring gear and a gear in the form of a sun gear with teeth which mesh with the teeth of the second stage. The teeth of the first and second stages are connected by a force-locked or frictional connection which allows various angular positions relative to the common axis of rotation. The force-locked connection also serves as a torque-limiting slip clutch for limiting the maximum transmissible torque.

13 Claims, 3 Drawing Sheets

PLANETARY GEARBOX

CROSS-REFERENCE TO RELATED APPLICATIONS

This application is a U.S. national stage application under 35 U.S.C. § 371 of International Application No. PCT/DE2015/100215, filed on May 29, 2015, and claims benefit to German Patent Application No. DE 10 2014 107 734.2, filed on Jun. 2, 2014. The International Application was published in German on Dec. 10, 2015, as WO 2015/185036 A1 under PCT Article 21(2).

FIELD

The invention relates to a planetary gear train comprising a gear pair having a plurality of first gearwheels.

BACKGROUND

DE 37 34 462 A1 already describes a planetary gear train of this type having interlocking gearwheels that comprise opposing conically formed teeth, at least one of the two gearwheels being axially moveable relative to the other gearwheel in the direction of the other gearwheel. The planetary gears are mounted on a rotationally fixed shaft that is formed by a pin that is adjustable in the axial direction. The position of the planetary gears cannot be changed during operation, and therefore setting the planetary gears requires the planetary gear train to be disassembled.

DE 94 05 495 U1 discloses, in a gear train, preloading a shaft bearing a conical gearwheel by means of a spring, for example a helical spring, if necessary by the intermediary of a pressure ball, relative to another conical gearwheel.

Tapered, conical gearwheels having a profile offset that is variable over the width are known as gear pairs having parallel axes. Said gearwheels are suitable for setting a backlash-free engagement by means of axial adjustment of one or both gearwheels.

Gearwheel teeth are also used with a high degree of accuracy in planetary gear trains for automatic handling devices (e.g. articulated arm robots, adjustment units, turntables, etc.). Planetary gear trains in these fields are characterized by high transferable torques in compact structural dimensions having very good efficiency levels. Furthermore, these gear trains can later be integrated into machines as a compact unit.

The high power density is achieved by means of a plurality of tooth engagements (sun gear, planetary gears and ring gear). Centre distance variations in the planet carrier as well as manufacturing influences on the teeth (e.g. tolerance fluctuations during production thereof) have a direct influence on the tooth engagements.

With regard to planetary and epicyclic gear trains in particular, which are composed of a plurality of interlocking components and in which the tolerances of the individual components thus have a very significant mutual influence, the manufacturing outlay is comparatively high. The use of tapered or conical gearwheels alone is generally not sufficient either, since the adjustment of one gear pairing can influence the adjustment of another gear pairing (e.g. the adjustment of a plurality of planetary gears acting on one sun or ring gear).

The sun gear and planetary gears must be geometrically arranged inside the ring gear. Since, in practice, there can only be a whole number of gear teeth, the following condition must be met in terms of the number of gear teeth:

$$\frac{z_2 + z_1}{q} = \text{whole number}$$

in which $z_2$=number of gear teeth of the ring gear, $z_1$=number of gear teeth of the sun gear and q=number of planetary gears.

SUMMARY

An aspect of the invention provides a planetary gear train, comprising a gear pair including: two or more first gearwheels, each designed as planetary gears and including a first axis of rotation, the first gearwheels each including a first and second stage, first teeth that form the first stage and that mesh with a ring gear, and second teeth that form the second stage; a second gearwheel configured as a ring gear including a second axis of rotation that extends in parallel with the first axis of rotation; and a gearwheel configured as a sun gear that meshes with the second teeth, wherein the first teeth of the first stage and the second teeth of the second stage are interconnected using a non-positive or frictional connection.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
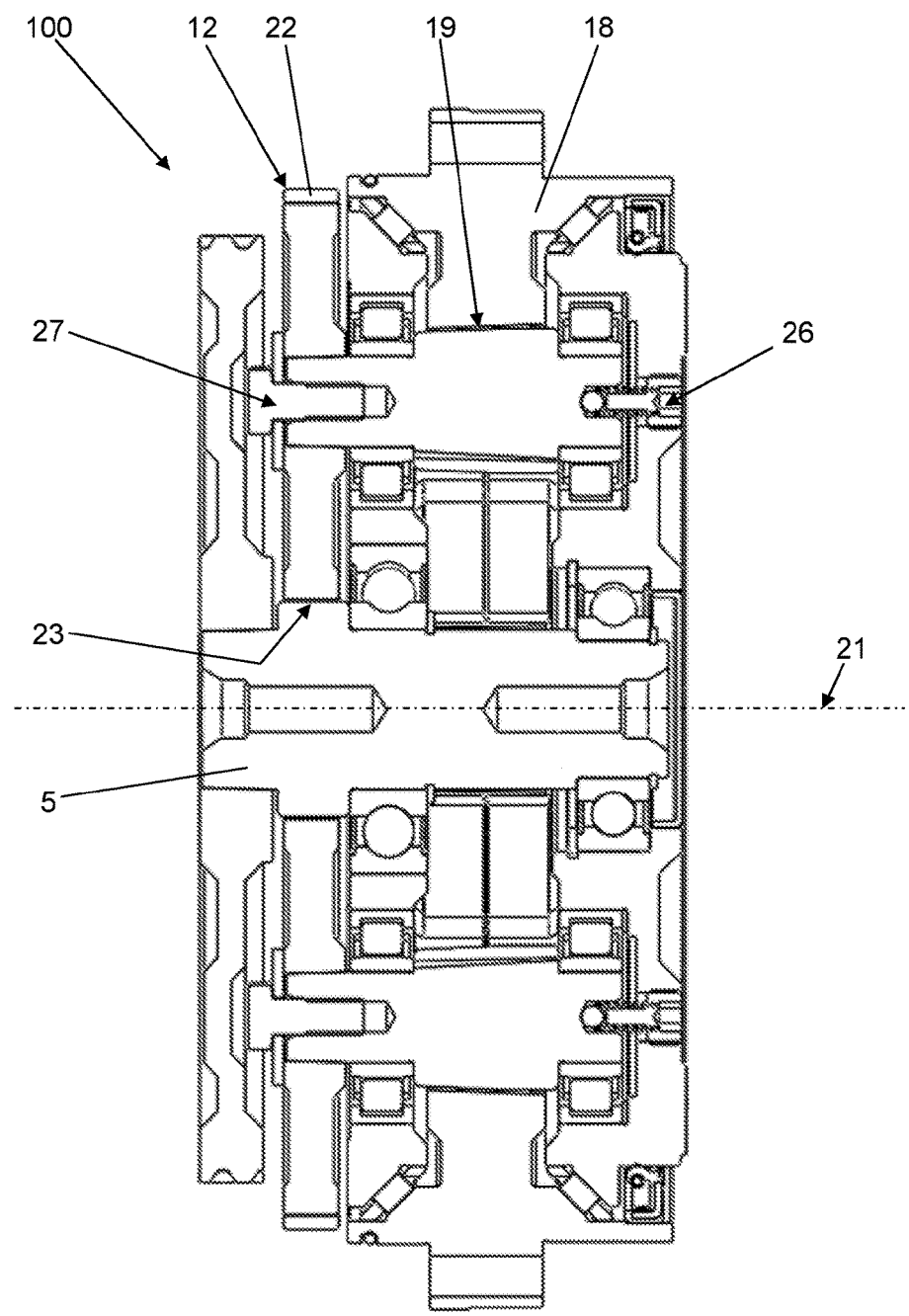
FIG. 1 shows a planetary gear train according to the invention.

An aspect of the invention is therefore to expand the possibility of gear ratio combinations and to simplify assembly.

An aspect of the invention relates to a planetary gear train comprising a gear pair having a plurality of first gearwheels that are each designed as planetary gears having a first axis of rotation, the first gearwheels each being designed having two stages, comprising teeth that form a first stage and mesh with the ring gear, and comprising teeth that form a second stage, a second gearwheel designed as a ring gear having a second axis of rotation that extends in parallel with the first axis of rotation, and a gear designed as a sun gear that meshes with the teeth of the second stage.

An aspect of the invention is achieved in that the teeth of the first stage and the teeth of the second stage are interconnected in a non-positive or frictional manner.

As a result, the gearing laws that apply to planetary gear traines and the related planetary gear train installation requirements can be ignored, and the assembly is also simplified considerably. Furthermore, by taking these measures, the gear ratio combinations can be expanded. Establishing a non-positive connection between the two gearwheels of a stepped planetary gear is crucial for this and ensures that any desired position between the two wheels or between the wheel and the pinion can be achieved. Moreover, aligning the tooth gaps of the teeth of the planetary stage and those of the sun gear stage, which is done during the assembly process, has a positive effect. In the embodiments known from the prior art, the gaps in the gear teeth are found exclusively by means of the manufacturing process.

For this purpose, the teeth of the first stage and the teeth of the second stage are initially not fixed in different angular positions relative to the common axis of rotation, but rather they are fixed only during assembly, by means of a fixing agent such as a fixing screw that is screwed into the end face.

A plurality of frictional and/or clamping connection techniques are known in their own right from the prior art. Furthermore, according to a preferred embodiment of the invention, the non-positive connection can comprise a torque-limiting slip clutch, with the result that undesired overloading of the gear train is avoided.

In this case, according to a preferred embodiment, the maximum transferable torque can set to a specific value and limited thereby.

A particularly simple structure is achieved by the connection comprising a clamp connection, in particular a tapered connection, or additionally a tapered clamping element. In this way, the first stage of the first gearwheel is fixed onto a tapered circumferential portion of the second stage of the first gearwheel in a non-positive or frictional manner.

Since the second stage is cantilevered, having a first bearing between the first stage and the second stage and a further bearing on a side of the first stage remote from the second stage, larger planetary gears can also be used.

The planetary gears are preferably each designed having two stages, each planetary gear comprising tapered teeth that mesh with the ring gear, and a second set of non-tapered teeth that mesh with teeth of the sun gear. This makes it possible to achieve simple, maintenance-free automatic readjustment by preloading solely the planetary gears relative to the ring gear.

At the same time, the combination of conical and non-conical teeth for each planetary gear in conjunction with the corresponding teeth of the sun gear and/or ring gear also produces automatic tolerance compensation at the desired high load capacity.

The planetary gear train according to the present invention preferably also comprises an adjustment device that acts axially on the first gearwheel by generating an axial effective force there and/or being adjustable over an axial adjustment path. In this case, the axial effective force axially pushes or pulls the tapered teeth of a first gearwheel into likewise tapered (opposing) teeth of the second gearwheel, such that, during operation, the teeth of the first and second gearwheels interlock in a substantially backlash-free manner.

In one embodiment, the adjustment device comprises a resilient obturator that exerts the effective force for this purpose. A resilient obturator of this type forms a spring system together with the other more or less resilient components, which spring system axially pushes or pulls the teeth into contact.

The tapered teeth or the cylindrical teeth can be designed as straight teeth (axially parallel), helical (helical teeth) or as double-helical teeth. The teeth can also be beveloid teeth.

Figure 2:
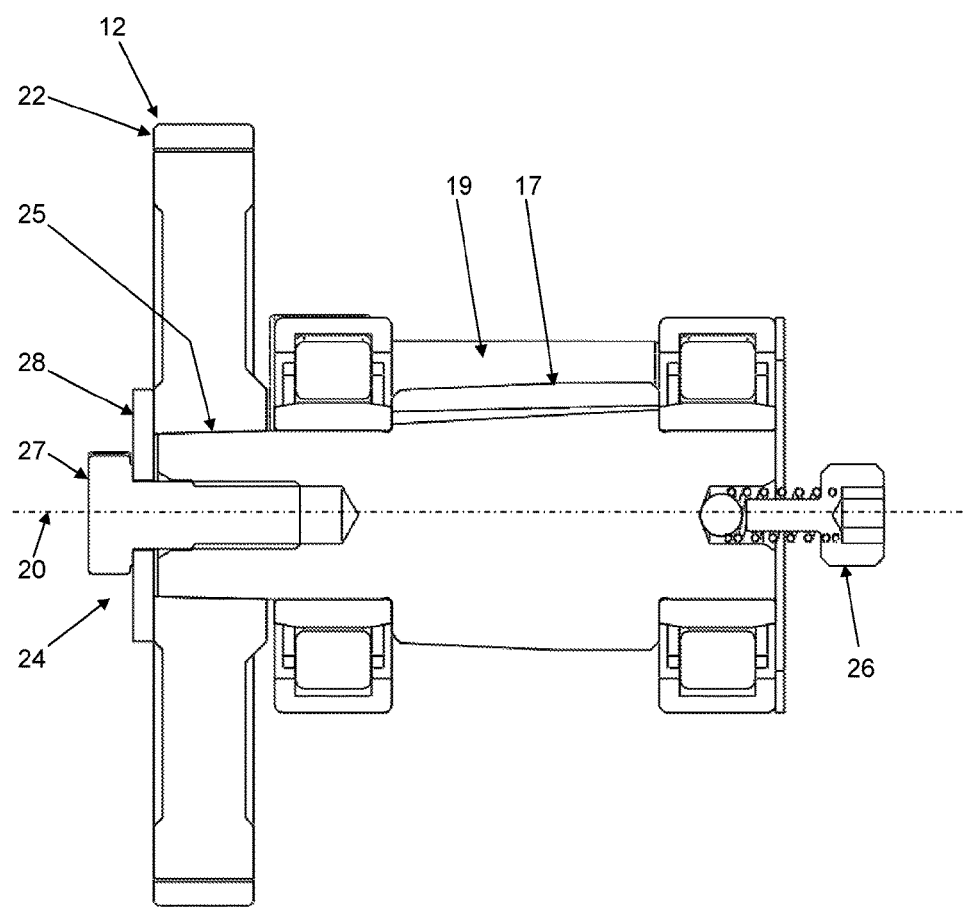
FIG. 2 is an enlarged view of a planetary gear train having a first and second stage.
Figure 3:
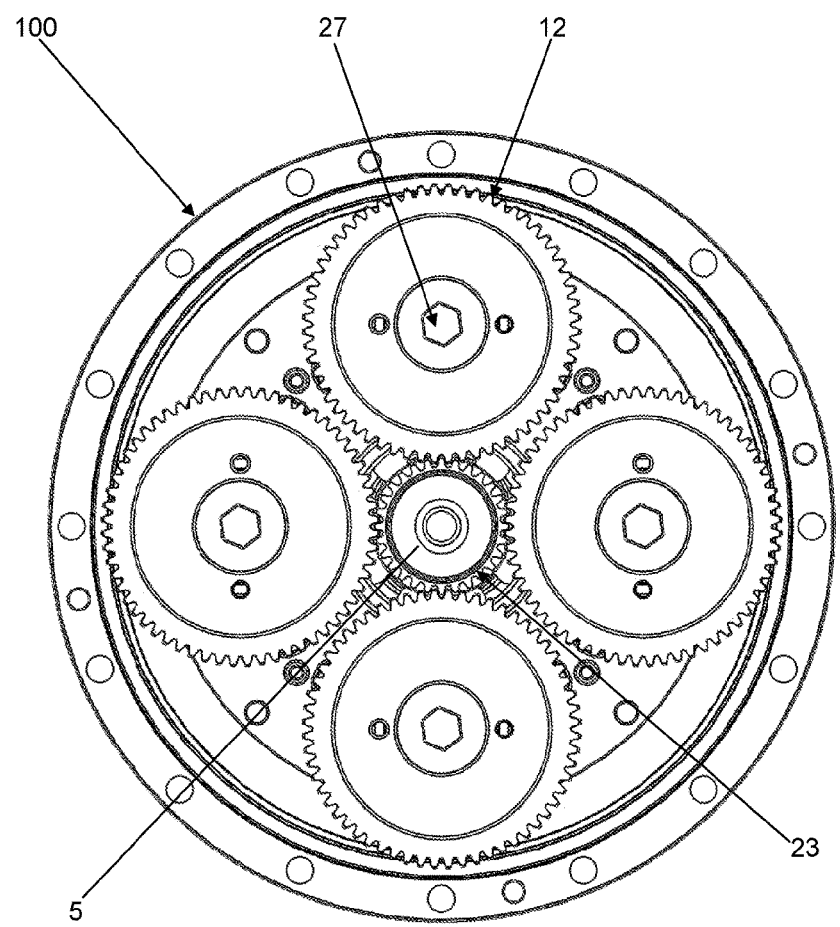
FIG. 3 is a front view of a planetary gear train.

The planetary gear train 100 according to the invention is described in more detail below on the basis of FIGS. 1 to 3. The planetary gear train 100 comprises a plurality of first gearwheels 12 that are each designed as planetary gears and are each mounted so as to be rotatable about a first axis of rotation 20. Each gearwheel is designed having two stages, having tapered teeth 17 that form a first stage and mesh with a ring gear 18, and having teeth 22 that form a second stage. Furthermore, the planetary gear train 100 has a second gearwheel 18 that is designed as a ring gear, and a gearwheel 5 that is designed as a sun gear having teeth 23 that mesh with the teeth 22 of the second stage. The teeth 17, 22 of the first and second stages are interconnected by means of a non-positive or frictional connection 24, allowing for various relative angular positions in relation to the common axis of rotation 20. Moreover, the non-positive connection 24 functions as a torque-limiting slip clutch for limiting the maximum transferable torque. In this case, the connection 24 is easily achieved by means of the first stage of the first gearwheel 12 being frictionally fixed on a tapered circumferential portion 25 of the second stage of the first gearwheel 12. The connection 24 is fixed in this case by means of a screw connection on the end face, a cantilevered arrangement being achieved.

Furthermore, the planetary gear train 100 comprises an adjustment device 26 for generating an axial effective force in order to axially preload teeth 17 of the first gearwheel 12 relative to teeth 19 of the second gearwheel 18. In this way, the teeth 17 of the first gearwheel 12 and the teeth 19 of the second gearwheel 18 interlock in a substantially backlash-free manner during operation.

The planetary gear train 100 is assembled by means of the following steps: firstly, the tapered teeth 17 of the first gearwheel 12 and the tapered teeth 19 of the second gearwheel 18 are pushed into one another in a backlash-free manner. Then the teeth 22 of the second stage are placed on a conical seat of the connection 24 and aligned with the teeth 23 of the sun gear. The teeth 22 are then pressed on, the non-positive connection is produced and axially secured using a screw 27 and a disc spring 28. The disc spring 28 maintains the axial operating tension between the screw 27 and the teeth 22.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A planetary gear train, comprising a gear pair including:
   two or more first gearwheels, each designed as planetary gears and including a first axis of rotation, the first gearwheels each including a first and second stage, first teeth that form the first stage and that mesh with a ring gear, and second teeth that form the second stage;
   a second gearwheel configured as the ring gear including a second axis of rotation that extends in parallel with the first axis of rotation; and
   a gearwheel configured as a sun gear that meshes with the second teeth,
   wherein the first teeth of the first stage and the second teeth of the second stage are interconnected using a non-positive connection, and
   wherein the non-positive connection includes a torque-limiting slip clutch.

2. The train of claim 1, wherein the first teeth of the first stage and the second teeth of the second stage can be fixed in different angular positions relative to the first axis of rotation, which is common to the gearwheels.

3. The train of claim 1, wherein a maximum torque that can be transferred by the slip clutch is adjustable.

4. The train of claim 1, wherein the non-positive connection includes a clamping connection.

5. The train of claim 1, wherein the first stage of the first gearwheel is fixed on a tapered circumferential portion of the second stage of the first gearwheel in a non-positive or frictional manner.

6. The train of claim 1, wherein the second stage is cantilevered.

7. The train of claim 1, wherein the first gearwheels and the second gearwheel are configured to be axially displaceable relative to one another in a direction of the first axis of rotation.

8. The train of claim 1, wherein the first teeth of the first gearwheel and third teeth of the second gearwheel are tapered or conical in each case.

9. The train of claim 8, further comprising:
   an adjustment device configured to generate an axial effective force and/or an axial adjustment path such that the first teeth of the first gearwheel are axially adjustable and/or preloadable relative to a further gear of the second gearwheel, such that the first teeth of the first gearwheel and the third teeth of the second gearwheel interlock in a substantially backlash-free manner during operation.

10. The train of claim 1, wherein the second teeth and fourth teeth are cylindrical.

11. The train of claim 1, wherein the non-positive connection includes a tapered connection.

12. The train of claim 1, wherein the first stage of the first gearwheel is fixed on a tapered circumferential portion of the second stage of the first gearwheel in a non-positive manner.

13. The train of claim 1, wherein the first stage of the first gearwheel is fixed on a tapered circumferential portion of the second stage of the first gearwheel in a frictional manner.

* * * * *